United States Patent [19]
Montgomery

[11] Patent Number: 5,238,986
[45] Date of Patent: Aug. 24, 1993

[54] NONAQUEOUS COMPOSITION FOR SLIP CASTING OR COLD FORMING REFRACTORY MATERIAL INTO SOLID SHAPES

[75] Inventor: Lionel C. Montgomery, Bay Village, Ohio

[73] Assignee: Praxair S.T. Technology, Inc., Danbury, Conn.

[21] Appl. No.: 837,606

[22] Filed: Feb. 21, 1992

Related U.S. Application Data

[63] Continuation-in-part of Ser. No. 570,739, Aug. 22, 1990, abandoned.

[51] Int. Cl.$^5$ .................................................. C08K 5/07
[52] U.S. Cl. ..................................... 524/365; 524/300; 524/394; 524/404; 524/406; 524/407; 524/408; 524/424; 524/428; 524/442; 524/563
[58] Field of Search ............... 524/365, 563, 300, 394, 524/404, 406, 407, 408, 424, 428, 442

[56] References Cited

U.S. PATENT DOCUMENTS

| | | | |
|---|---|---|---|
| 2,459,164 | 1/1949 | Holst | 524/365 X |
| 2,733,223 | 1/1956 | Van Etten | 524/365 X |
| 3,034,915 | 5/1962 | Kornbluth | 524/365 X |
| 3,376,247 | 4/1968 | Reddy et al. | 524/365 |
| 3,560,460 | 2/1971 | Gilbert | 524/365 X |
| 3,711,576 | 1/1973 | Hwa | 524/365 X |
| 4,067,841 | 1/1978 | Aurichio | 524/365 X |
| 4,529,768 | 7/1985 | Achard et al. | 524/365 |
| 4,596,848 | 6/1986 | Speer | 524/365 |
| 4,826,901 | 5/1989 | Ittmann et al. | 324/145 |
| 4,880,759 | 11/1989 | Kohut | 501/148 |

*Primary Examiner*—Joseph L. Schofer
*Assistant Examiner*—J. M. Reddick
*Attorney, Agent, or Firm*—E. Lieberstein

[57] ABSTRACT

The composition of the present invention is composed of finely divided solid refractory material suspended in a nonaqueous liquid slip composition. The nonaqueous liquid slip composition consists essentially of a deflocculent composed of a vinyl chloride and vinyl acetate resin dissolved in an organic solvent. The composition may be slip cast or cold formed into a low density article which is then sintered into a dense product.

4 Claims, 1 Drawing Sheet

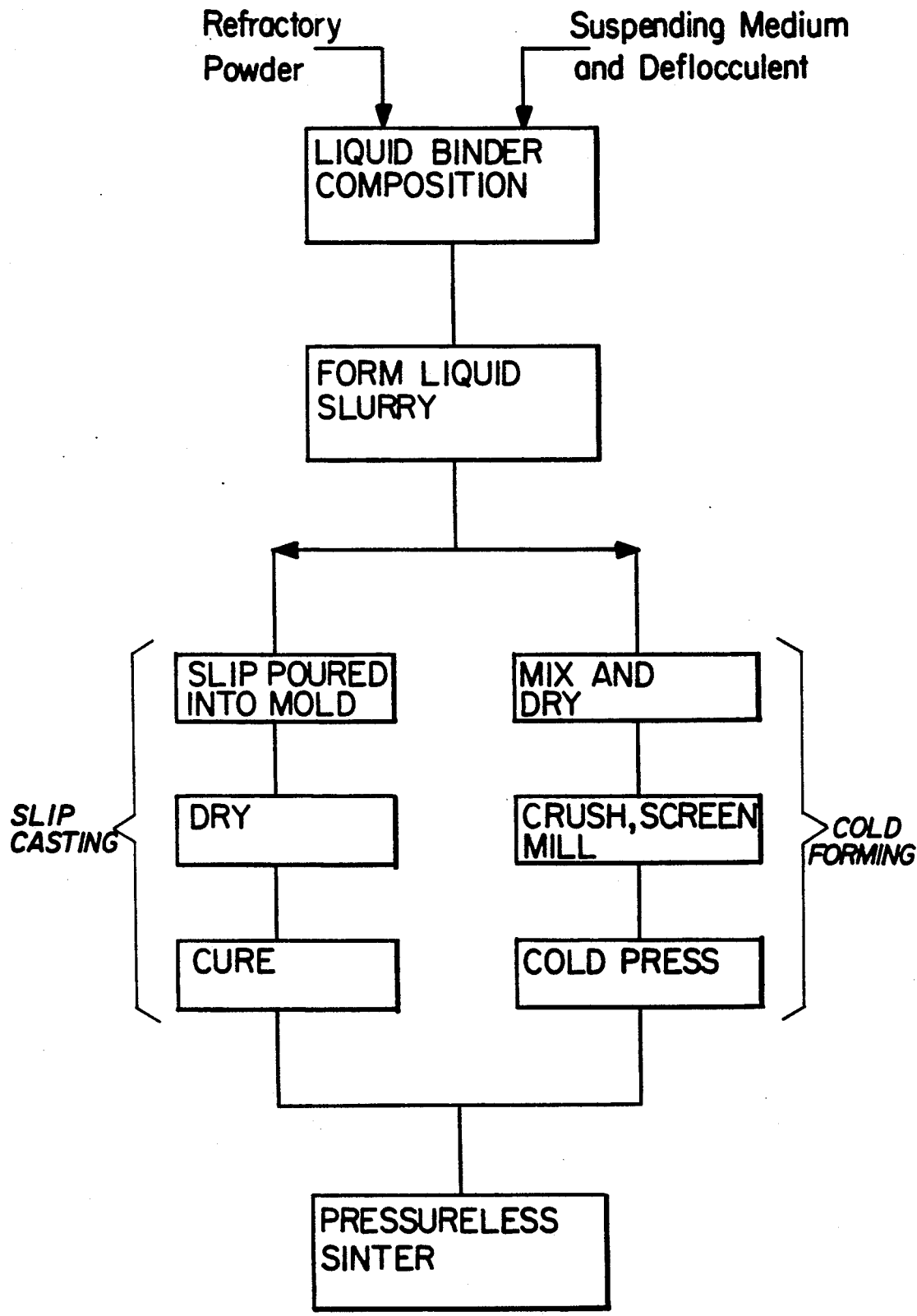

NONAQUEOUS COMPOSITION FOR SLIP CASTING OR COLD FORMING REFRACTORY MATERIAL INTO SOLID SHAPES

FIELD OF INVENTION

This application is a continuation-in-part of U.S. patent application Ser. No. 570,739 now abandoned, and relates to an organic liquid slip composition for slip casting of non-oxide ceramic refractory materials and to a method for cold forming refractory shapes from such compositions.

BACKGROUND OF THE INVENTION

Slip casting and cold forming are well-known methods to form a desired shape from a powdered material.

In conventional slip-casting practice, the material to be cast is milled or otherwise processed into a finely divided powder of predetermined particle size generally between 1-5 microns. The finely divided material is then mixed with a liquid-suspending medium to form what is conventionally known as a slip which is poured into a suitable mold, e.g., a plaster of Paris mold. In the mold, the liquid suspending medium is drawn by capillary action into the body of the mold, and the remaining solids are deposited in coherent form. After drying, the shape may be removed from the mold and further processed into a final product.

For effective casting, a deflocculent should be included in the suspending medium to bind the different size particles into a uniform suspension so that the final product does not have a segregated structure. For non-oxide ceramic refractory materials such as borides, carbides, nitrides and silicides the liquid suspending medium requires an organic vehicle, i.e. the suspending medium cannot be an aqueous slurry. Presently, a small amount of a low molecular weight polymeric cyclopentadiene is used as the deflocculent of choice and is dissolved in an organic suspending medium selected from the group consisting of xylene, toluene, benzene, naphtha, and alcohol. The cyclopentadiene is generally added in a proportion of 5-12 percent by weight of the slip-suspending medium.

SUMMARY OF THE INVENTION

The present invention is based on the discovery of a novel nonaqueous slip composition containing a deflocculent for use in slip casting as a substitute for the conventional cyclopentadiene system or for cold forming. The nonaqueous slip composition of the present invention comprises a polymeric vinyl chloride and vinyl acetate resin composition dissolved in an organic solvent preferably an organic ketone.

BRIEF DESCRIPTION OF THE DRAWING

The single FIGURE is a flow diagram illustrating the sequence for slip casting or cold forming a refractory shape from a refractory powder using the suspending medium and deflocculent of the present invention.

DESCRIPTION OF THE PREFERRED EMBODIMENT

A slip cast of a refractory material is formed in accordance with the present invention into a complex solid and/or hollow green shape having a high density using a binder-deflocculent composition formed from a resinous composition of vinyl chloride and vinyl acetate dissolved in an organic solvent. The refractory material may be formed from a composition of any of the following taken alone or in combination: a metal boride such as $CrB_2$, $ZrB_2$, or $TiB_2$; a refractor1carbide such as WC, TiC, or $B_4C$; a nitride such as $Si_3N_4$ and AlN; a silicide such as $TiSi_2$ and MoSi; and a refractory metal such as W, Mo, Ta, and Cr.

A binder composition is prepared from a preselected refractory material composition based on the desired characteristics for the cast article. Thus if the article is to be used for the vaporization of aluminum, the refractory material composition would preferably be a blend of a metal boride and nitride such as AlN in a desired ratio to establish a given electrical resistivity. A grain growth inhibitor is preferably added into the powder blend. A preferred grain growth inhibitor is $CrB_2$ between 1-5% by weight. This boride enters into solid solution with the materials during sintering at high temperatures and acts as a grain growth inhibitor by decreasing the mobility of the grain boundaries.

The refractory powder composition is reduced to an average particle size of about 3-5 microns.

The finely divided powder is then suspended in a liquid suspending medium containing a polymeric resin of vinyl chloride and vinyl acetate dissolved in an organic solvent. The preferred composition is vinyl acetate/vinyl chloride containing 80-90% vinyl chloride balance vinyl acetate. The optimum ratio is 86% vinyl chloride and 14% vinyl acetate. The vinyl acetate/vinyl chloride composition is dissolved in an organic solvent of preferably an organic ketone or an acetate to form the liquid binder composition of the present invention. The preferred organic ketone is methylethylketone (hereafter "MEK") although any conventional organic ketone may be used.

The preferred range for the refractory powder and liquid suspension medium forming the binder composition of the present invention is as follows:

| | |
|---|---|
| Powder of refractory material | 78.8–90 wt. % |
| Vinyl Acetate/Vinyl Chloride | 0.5 to 2.2 wt. % |
| MEK | 9.5 to 19 wt. % |

An example binder composition for a 34% $TiB_2$, 63% AlN, and 3% $CrB_2$ refractory powder is as follows:

| | |
|---|---|
| Powder | 82.6 wt. % |
| MEK | 15.7 wt. % |
| PVA | 1.70 wt. % |

The binder composition is preferably ball-milled to deagglomerate the powder to form a smooth homogenous liquid slurry which represents a well lubricated slip for slip casting.

The slip is then cast as follows:

a. The slip is poured into a shaped plaster of Paris mold. The liquid portion of the slip is drawn into the porous mold by capillary forces, and the solid powder particles are deposited on the surface of the plaster mold to form a coherent layer. When the layer reaches the desired thickness, that portion of the slip that is still liquid may be drained out of the mold. If desired, however, solid castings can be prepared.

b. The shape is air-dried in the mold until it can be handled without fracture. The time varies from one hour for small shapes, such as one-to two-inch diameter crucibles, to 24 hours for castings weighing several pounds.

c. The shapes are further dried outside the plaster mold in an oven at −80° C. to rid the structure of MEK and to cure the vinyl acetate/vinyl chloride binder system.

d. The cured shapes may be machined, lathed, sanded, etc., if necessary.

If, however, it is desired to fabricate refractory shapes by cold forming (isostatic, die pressing, etc.), the liquid slurry representing the slip can be dried, for example, in a mixer such as a Hobart, and the MEK vaporized out of the slip to produce a dried powder. The dried powder is micromilled to break up agglomerates created during the mixing and drying operation and then cold formed into shapes. The slip preparation process and the mixing and drying operation produce a refractory powder that is coated with the vinyl chloride-vinyl acetate resin. This coating imparts excellent lubricity to the powder and reduces the friction not only among the powder particles but also between the powder and the die wall when die pressing operations are carried out. The green density is normally higher when lubricated refractory particles are die pressed. In the following example the green density was 4.84% higher when 1.25″ φ compacts were cold pressed at 36,600 psi compared to the green density of nonlubricated powder of the same composition.

EXAMPLE I

| Powder | Wt. % | Grams |
|---|---|---|
| $TiB_2$ | 34 | 280.84 |
| AlN | 63 | 520.38 |
| $CrB_2$ | 3 | 24.78 |

Powder milled to give average particle size of 3.0–3.5 microns.
Suspending Medium
17 grams Vinyl Acetate/Vinyl Chloride.
Deflocculent
MEK—157 grams
Slurry formed by milling $TiB_2$-AlN-$CrB_2$ powder suspended in MEK Vinyl Chloride/Vinyl Acetate Binder Solution.

For Slip Casting
1. Slip poured into shaped plaster molds to produce hollow or solid $TiB_2$-AlN-$CrB_2$ shapes.
2. Shape is dried and removed from mold.
3. Cured at ~80° C. and, if necessary machined.

For Cold Forming
1. Slip poured into mixer.
2. MEK is vaporized from slip composition.
3. Micromill dried powder to produce a uniform nonagglomerated powder.
4. Powder cold formed into shape by a pressing operation (die pressing, isostatic pressing, etc.).
5 Cured at ~80° C. and, if necessary, machined.

The cured product, either slip cast or cold formed, may then be pressureless sintered in a $TiB_2$-AlN-$CrB_2$ powder pack within a graphite capsule with argon inlet and outlet. The operation is carried out between 1800° and 2200° C. at a heat rate of ~400°/hour.

The fabricated refractory shapes following either the slip-casing or cold-forming operations as described, may be cured at ~80° C. in air and machined, if necessary, and then pressureless sintered to increase their density. Pressureless sintering is preferably conducted in a powder pack of a refractory material similar to the fabricated shape in an inert atmosphere of, for example, argon. The sintering temperature is between 1800° and 2200° C. with a hold time of approximately two hours and a heat rise of ~400° C./hour for 0.5″ thick green stock. The following is an example of a pressureless-sintered article from a $TiB_2$-AlN-$CrB_2$ slip-cast green stock made in accordance with the present invention.

EXAMPLE II

|  | Slip Cast | Pressureless Sintering |
|---|---|---|
| Diameter | 1.247 | 1.065 |
| Length | 0.619 | 0.527 |
| Weight, gms | 35.83 | 24.26 |
| Volume, cc | 12.388 | 7.693 |
| Density, % Th. | 63.0 | 97.02 |
| $H_2O$ Immersion Density % Theoretical → 97.45 | | |

In accordance with the present invention the preferred composition of the slip system consists essentially of a vinyl chloride/vinyl acetate deflocculent and an organic solvent as follows:

Optimum Composition of Slip System

| deflocculent | Range (wt %) | Optimum (wt %) |
|---|---|---|
| 86 wt % vinyl chloride/ 14 wt % vinyl acetate | 2.87–12.64 | 9.77 |
| Solvent (preferably methylethylketone) | 87.36–97.13 | 90.23 |

EXAMPLE III

The above slip system is used to cast solid shapes from different refractory powder compositions of for example:

| Slip | Preferred | | Minimum | | Maximum | |
|---|---|---|---|---|---|---|
|  | gms | wt % | gms | wt % | gms | wt % |
| (a) Powder composition (wt %): $TiB_2$ - 34  ALN - 63  $CrB_2$ - 3 | | | | | | |
| Powder | 100 | 82.6 | 100 | 82.6 | 100 | 82.6 |
| deflocculent | 2.059 | 1.7 | 0.605 | 0.5 | 2.663 | 2.2 |
| solvent (MEK) | 19.011 | 15.7 | 20.465 | 16.9 | 18.407 | 15.2 |
| (b) Powder composition = tungsten 100 wt %. | | | | | | |
| Powder | 100 | 86 | 100 | 86 | 100 | 86 |
| deflocculent | 1.59 | 1.37 | 0.467 | 0.4 | 2.058 | 1.77 |
| solvent (MEK) | 14.689 | 12.63 | 15.812 | 13.6 | 14.221 | 12.23 |

The content of the powder compositions in the above slips can vary ±2.5% without significantly affecting the slip properties.

What is claimed is:

1. A composition for slip casting or cold forming non-oxide refractory material(s) into solid shape comprising finely divided solid refractory materials selected from the group consisting of metal boride, refractory carbide, nitride, silicide and a refractory metal of tungsten, molybdenum, tantalum and chromium suspended in a nonaqueous liquid slip composition consisting essentially of a deflocculent composed of a vinyl chloride-vinyl acetate resin dissolved in an organic solvent.

2. A composition as defined in claim 1 wherein said deflocculent consists essentially of 80–91 wt. % vinyl chloride balance vinyl acetate.

3. A composition as defined in claim 2 wherein said organic solvent is an organic ketone or an acetate.

4. A composition as defined in claim 2 wherein said ketone is methylethylketone.

* * * * *